United States Patent
Pappalardo et al.

(10) Patent No.: US 7,191,314 B2
(45) Date of Patent: Mar. 13, 2007

(54) RECONFIGURABLE CPU WITH SECOND FSM CONTROL UNIT EXECUTING MODIFIABLE INSTRUCTIONS

(75) Inventors: Francesco Pappalardo, Paterno (IT); Agatino Pennisi, Nocera Inferiore (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 344 days.

(21) Appl. No.: 10/682,378

(22) Filed: Oct. 9, 2003

(65) Prior Publication Data

US 2004/0133770 A1  Jul. 8, 2004

(30) Foreign Application Priority Data

Oct. 11, 2002  (EP) .................................. 02425620

(51) Int. Cl.
 *G06F 9/30* (2006.01)
(52) U.S. Cl. ....................... 712/208; 712/211; 712/248
(58) Field of Classification Search ..................... None
See application file for complete search history.

(56) References Cited

U.S. PATENT DOCUMENTS

| | | | | |
|---|---|---|---|---|
| 5,335,331 A | * | 8/1994 | Murao et al. ................. | 712/213 |
| 5,729,757 A | * | 3/1998 | Shekels .......................... | 712/1 |
| 5,737,631 A | * | 4/1998 | Trimberger ................... | 712/37 |
| 5,774,686 A | * | 6/1998 | Hammond et al. .......... | 712/209 |
| 5,848,289 A | * | 12/1998 | Studor et al. ................. | 712/32 |
| 6,049,862 A | | 4/2000 | Bauer et al. ................. | 712/208 |
| 6,138,229 A | * | 10/2000 | Kucukcakar et al. ......... | 712/37 |

OTHER PUBLICATIONS

Ertem, M., "A Reconfigurable Co-Processor for Microprocessor Systems," in *Proceedings of the Southeast Conference*, Tampa, Apr. 5-8, 1987, New York, IEEE, vol. 1, pp. 225-228.
"Design Flexibility into Hardwired Logic," *IBM Technical Disclosure Bulletin* 37(3):321-324, Mar. 1994.
Hennessy, J. et al., *Computer Organization and Design. The Hardware/Software Interface*, Morgan Kaufman Publishers, San Francisco, 1994, Appendix C, "Mapping Control to Hardware", pp. C3-C28.
Jain, R., "An Alternative Approach Towards the Design of Control Units," *Microelectronics and Reliability* 24(6):1009-1012, 1984.
"Opcode Compare Facility," Research Disclosure No. 315. Kenneth Mason Publications, p. 577. Jul. 1990.

* cited by examiner

*Primary Examiner*—Kenneth S. Kim
(74) *Attorney, Agent, or Firm*—Lisa K. Jorgenson; Rob R. Cottle; Seed IP Law Group PLLC

(57) ABSTRACT

A reconfigurable control structure for CPUs comprises a first control unit with a first basic instruction set associated therewith, and a second control unit, with a second instruction set associated therewith. Associated with the second control unit is at least one programming element for rendering the second instruction set selectively modifiable. Also present is at least one circuit element for supplying instruction codes to be executed to the first control unit and to the second control unit, so that each instruction can be executed under the control of at least one between the first control unit or the second control unit according to whether the instruction is comprised in the first basic instruction set and/or in the second selectively modifiable instruction set.

18 Claims, 3 Drawing Sheets

RECONFIGURABLE CPU WITH SECOND FSM CONTROL UNIT EXECUTING MODIFIABLE INSTRUCTIONS

FIELD OF THE INVENTION

The present invention relates to control units for central processing units (CPUs).

DESCRIPTION OF THE RELATED ART

In a CPU, it is generally possible to distinguish two sections referred to as "paths:"
- the path followed by the data (data path), which involves the arithmetic-logic unit (ALU), registers and buses; and
- the path followed by the control signals (control path) to the devices of the data path.

In the context of the control path, selection signals (for operations on the ALU, selection of registers) and timing signals (clock, enabling signals) can moreover be distinguished.

In the above context of application, currently designated by control unit (CU) is a finite state machine designed for coordinating and managing the signal-activation timing sequences according to the types of processing required by the CPU. For each instruction, the control unit guides the CPU through a sequence of control states. In each control state, the control unit sends a set of signals which cause execution of the corresponding micro-operations.

The general scheme of such a control unit is represented in FIG. 1, where the reference CU designates precisely said control unit. Operation of the control unit CU is clocked by a clock signal CLK. The reference F designates, as a whole, the so-called state flags and conditioning flags, whereas the references CS1, CS2 and SB designate, respectively:
- the set of internal control signals to the CPU (not illustrated in the diagram of FIG. 1);
- the control signals on the system bus; and
- the signals coming form the system bus;

The reference IR designates the register where the current instruction is stored.

Again for purposes of general orientation, it is recalled that a finite state machine is a Moore state machine if the combinatorial logic which generates the outputs is only a function of the current state, whereas it is a Mealy state machine if the combinatorial logic that generates the outputs is a function both of the current state and of the inputs.

The solutions adopted for obtaining control units of the type considered previously amount to two fundamental models, i.e.:
- wired-logic solutions; and
- microprogrammed-logic solutions.

The general scheme of a wired-logic control unit is represented in FIG. 2, where the references IR, F, SB and CLK have the same meaning to which reference has already been made previously in the description of FIG. 1.

The core of the control unit represented in FIG. 2 is made up of an encoder block EB basically consisting of a combinatorial-signal generator. The generator in question is designed to receive at input the instructions (decoded by an appropriate instruction decoder ID), the flags F, the control signals SB coming from the system bus SB, as well as the clock signal CLK processed by a module SC designed to function as step counter and decoder, the purpose being to generate at output control signals CS generated according to a typical parallel format.

When the solution described in FIG. 2 is used, once the finite state machine that characterizes the wired-logic control unit has been defined, there follows a step of synthesis of the combinatorial networks required for calculating the outputs CS and the next state of the control unit, starting from the current state and the inputs. The block EB, therefore, basically consists of a circuit made up of flip-flops connected via combinatorial networks, i.e., via more or less complex networks of logic gates.

One of the major critical elements in a structure of this type is linked to the rigidity of the design. A modification of the control policies necessarily affects the design and dimensions of the finite state machine, with a marked incidence on production times and costs thereof.

The diagram of FIG. 3 represents, instead, the basic structure of a microprogrammed-logic control unit. Also in this case, the references IR, F, SB, CLK, and CS indicate the same entities already designated in the same way in FIG. 1 and/or FIG. 2.

In the solution represented in FIG. 3, the current instruction contained in the register IR and the flags F converge towards an address generator AG. The address generator AG operates under the control of a sequencer S, which is clocked by the clock signal CLK and at which there arrive the signals from the system bus SB. The addresses generated by the generator AG reach a microprocessor MPC, the operation of which evolves under the control of an incremental signal INCR coming from the sequencer S. The microprocessor MPC co-operates with a memory MCS, commonly referred to as control memory, in which a microprogram is stored, which defines the sequences of the control signals of the finite state machine. The output from the control memory CS drives a further circuit CB/D, which functions as control buffer/decoder. The circuit CB/D generates the control signals CS that are to be sent to the CPU. In the diagram of FIG. 3, there is also visible an internal address bus, designated by IAB, as well as a line EEF.

The module CB/D transmits on the bus IAB to the generator AG the current state of the control unit, whilst, on the line designated by EEF, it transmits internal control signals indicating the possible end of the instruction END or the end of the fetch step END FETCH or the end of the branch BRANCH.

The versatility of the solution illustrated in FIG. 3 appears evident once it is decided to modify the control policies. Leaving unaltered the combinatorial structure that supervises operation of the finite state machine, by adopting the solution represented in FIG. 3, it is sufficient to act on a microprogram stored in memory to obtain the necessary variations. Furthermore, the design of the circuitry part and the design of the instruction set may be performed in parallel, with savings both in terms of time and in terms of costs.

BRIEF SUMMARY OF THE INVENTION

An embodiment of the present invention provides a reconfigurable control structure which enables amplification and/or modification of the instruction set of a CPU by appropriately programming a memory in which the sequences of states defining the control signals required for execution of a given instruction are stored.

The control structure includes a programmable unit such as will enable the user to define new executable instructions and/or to redefine the basic implemented instructions.

Such an architecture means that the corresponding system will assume the characteristics of an open system: the user can, in fact, define the instruction set that he must use or that a particular application requires. A reconfigurability of this sort renders the microprocessor flexible, enabling the dimensions thereof to be contained, at the same time as the said microprocessor will be able to perform fully the instructions for which it is designed. The control structure thus combines both the advantages of an architecture of a CISC (Complete-Instruction-Set Computer) type, with complex instructions for the required applications, and the advantages of an architecture of the RISC (Reduced-Instruction-Set Computer) type, with a very small control unit.

BRIEF DESCRIPTION OF THE SEVERAL VIEWS OF THE DRAWINGS

The invention will now be described, purely by way of non-limiting example, with reference to the annexed drawings, in which.

DETAILED DESCRIPTION OF THE INVENTION

Figure 4:
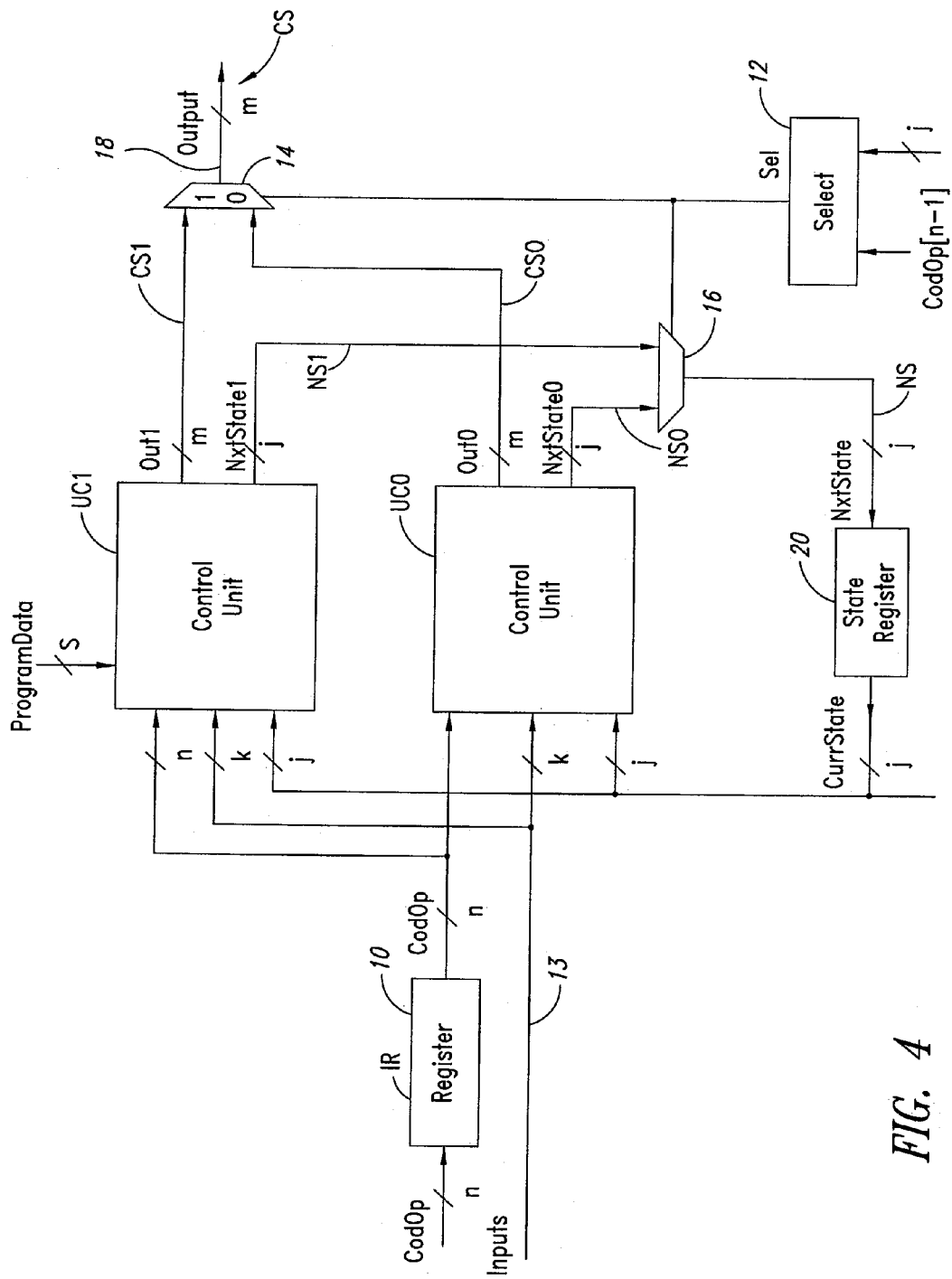
FIG. 4 represents, in the form of a block diagram, a reconfigurable control structure according to the invention.

In the diagram of FIG. 4, the references UC0 and UC1 designate two control units designed to operate in combination with one another.

Figure 2:
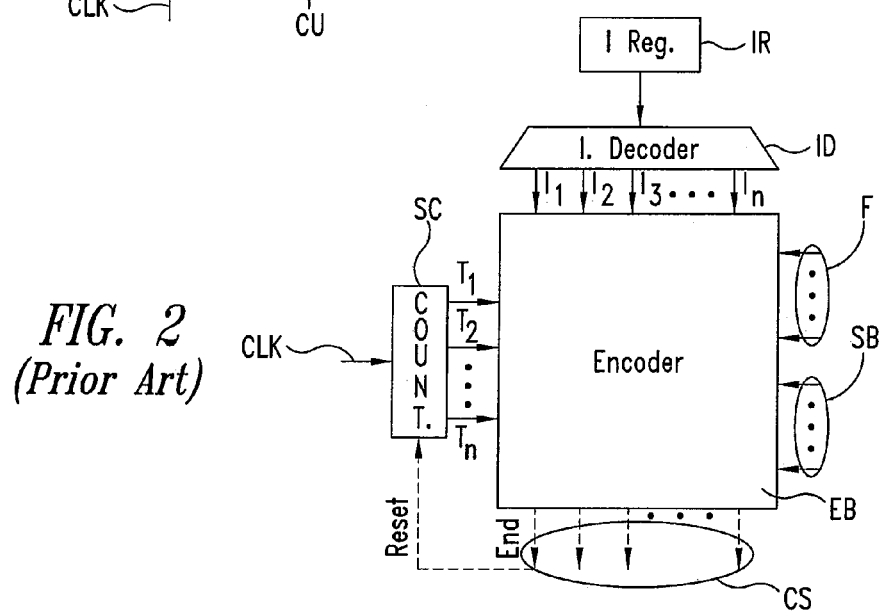

The control unit UC0 is basically a wired-logic control unit, hence having the general structure represented in FIG. 2.

Figure 3:
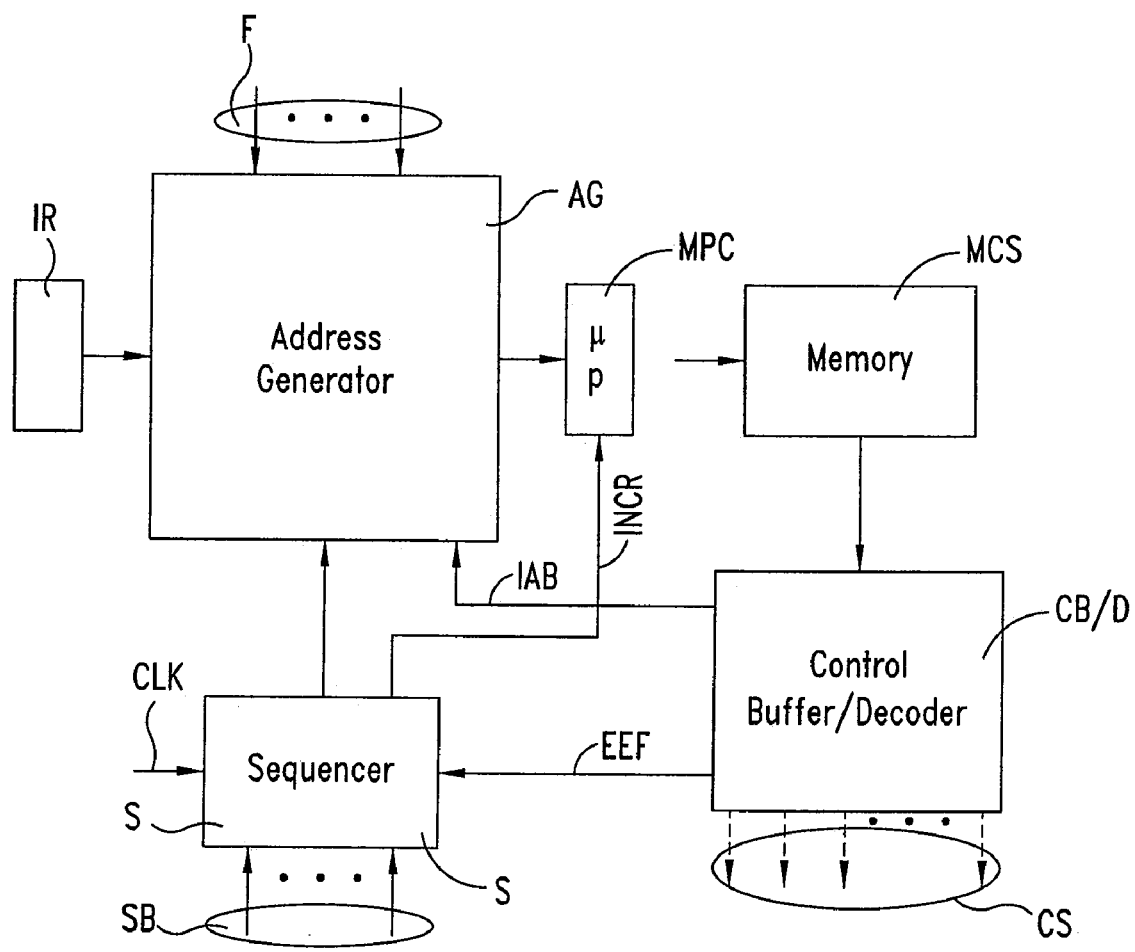

Set alongside the control unit UC0 is the control unit UC1, which corresponds basically to the structure represented in FIG. 3, hence to a programmable control unit.

Figure 1:
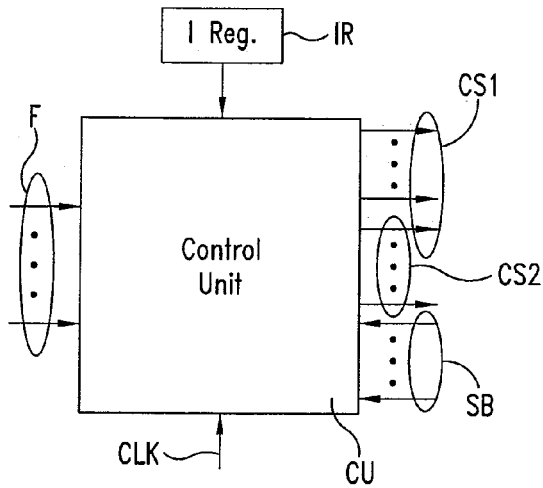
FIGS. 1 to 3, which represent, as a whole, the prior art, have already been described previously.

In this connection, it will be appreciated that the indication "Inputs" which appears in FIG. 4 also includes the conditioning flags designated by F in FIGS. 1, 2 and 3. The operating code of the instruction in the solution described here, is designated in FIG. 4 by Codop. Consequently, the register 10 of FIG. 4 is, in effect, the analog of the register IR of FIGS. 1, 2 and 3. The term "Input" has been used rather than "Flag" in order to render the description more general. The input signals "Inputs" (state signals, conditioning signals, etc., hereinafter referred to as "Inputs")—which are assumed as being organized as data in parallel format on k bits—are input into both of the units UC0 and UC1.

It is envisaged that the first unit UC0 will implement the control with reference to a basic instruction set (hence, a set that is the same as or smaller than a typical RISC set).

The second unit UC1, since it is programmable, can instead be used both for implementing the same instruction set as the control unit UC0 (for example, for debugging purposes or troubleshooting purposes) and for implementing new more complex instructions (hence, bringing the performance of the assembly practically up to that of a CISC system).

The use of the solution represented in FIG. 4 envisages the construction of an operating code CodOp (in general, on n bits) organized according to the following format:

| n-1 | n-2 | ... | 0 |
|---|---|---|---|
| CUSel | | | |

$$CUSel = \begin{cases} 0 \Rightarrow \text{Control Unit 0 selected and Outs1} = 0 \\ 1 \Rightarrow \text{Control Unit 1 selected and Outs0} = 0 \end{cases}$$

In the format illustrated above, the most significant bit, designated by CUSel, has the task of selecting the unit that generates the control signals for the instructions to be executed.

By means of a register 10 having the function of time memory, the operating code CodOp is sent both to the control unit UC0 and to the control unit UC1.

The n-th bit of the operating code, i.e., CodOp[n−1], which corresponds to the CUSel bit, is sent to a selection circuit 12 designed for driving two multiplexers 14 and 16.

The first multiplexer 14 picks up the outputs of both of the control units UC0, UC1—outputs designated by CS0 and CS1, respectively—and sends, on the output line of the control unit, designated by 18, a signal CS corresponding to the signal CS0 or CS1 according to the unit (UC0 or UC1) selected as unit that is to generate the control signals for the instruction to be executed.

A second multiplexer 16 selects, according to modalities altogether similar, which signal is to be sent to a state register 20 for identifying the state that is to be considered as current state of the system.

Specifically, the multiplexer 16 sends, to the register 20, a state signal NS (in general organized on j bits) chosen from between two homologous signals NS0 and NS1 generated by the unit UC0 and the unit UC1, respectively.

Both the multiplexer 14 and the multiplexer 16 operate according to the output signal Sel generated by the selection circuit 12.

In particular, the multiplexer 16 causes the signal NS to correspond to the state signal generated by the control unit (UC0 or UC1) which, at the moment, is generating the control signals for the instructions to be executed.

The control unit UC0 functions, in general, as a finite state machine of a traditional type. Starting from an initial idle or inactive state IDLE, the operating code of the instruction is received at input: if the instruction in question is found to form part of the basic instruction set, the unit UC0 passes to the next state, executing the instruction; otherwise, the unit UC0 remains in the idle state IDLE leaving the respective outputs at "0".

Operation of the control unit UC1 is, as a whole, similar, except that its instruction set is appropriately programmed by the control unit UC0 by means of an instruction within the basic instruction set dedicated to said function.

Basically, the solution described here envisages duplication of the control unit in the two units UC0 and UC1. The first unit in question, i.e., the unit UC0, is of the hardwired type, i.e., with a definitively fixed structure, according to the criteria commonly adopted in the prior art. Instead, the unit UC1 is programmable and hence flexible. Programming of the latter unit is performed by the unit UC0 by means of appropriate instructions, in practice with a memory-programming operation. For this reason, the programming instruction is included in th basic instruction set.

The table appearing below reproduces the so-called truth table of the selector module 12.

| CodOp[n − 1] | CurrState[j − 1] | CurrState[j − 2] | Sel |
|---|---|---|---|
| 0 | 0 | 000 . . . 0 | 0 |
| 1 | 0 | 000 . . . 0 | 1 |
| — | 0 | ≠0 | 0 |
| — | 1 | ≠0 | 1 |

In the table, the four columns represent, respectively:
the value of the most significant bit of CodOp, namely CodOp[n−1];
the value of the most significant bit of the current state, namely CurrState[j−1];
the value of the other j−1 bits of the current state, namely CurrState[j−2:0]; and
the value of the output signal Sel.

Figure 5:
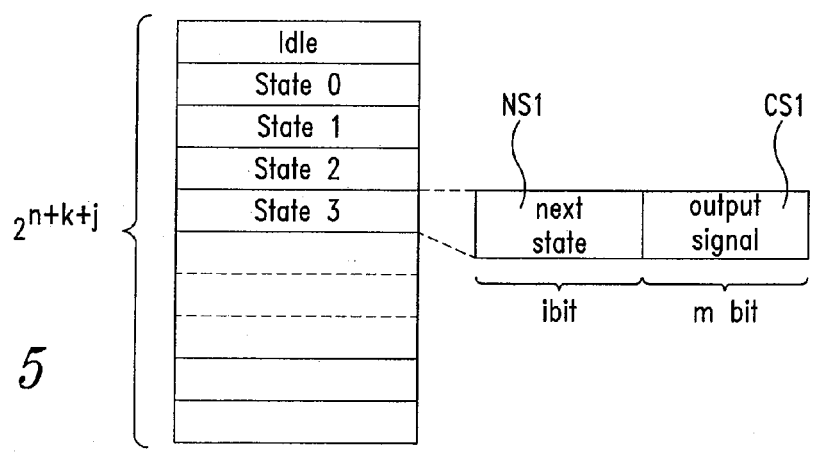
FIG. 5 is a diagram representing the memory of a control unit comprised in a structure according to the invention.

The diagram of FIG. 5 represents the structure of the memory of the control unit UC1, where, at the address 0, there appears the idle state IDLE. The control unit UC1 remains in this state until there arrives at input an operating code and the inputs such that said unit is involved in the generation of output control signals.

In the aforesaid idle state, the respective output lines corresponding to the signal CS1 are kept at "0." In the table of FIG. 5, there are comprised altogether $2^{n+k+j}$ allowed states for the possible machine. Each state is represented by a sequence of j+m bits, in which the first j bits (NS1) identify the next state, whilst the last n bits (CS1) correspond to the corresponding output signal.

In the unit UC1, the number j of state bits is preferably greater than or equal to the number of state bits of the control unit UC0. This makes possible, in the decoding step, total coverage of the states of the control unit UC0 by the control unit UC1.

The proposed solution enables duplication of the instruction set of a CPU simply by programming appropriately the programmable control unit.

The said solution likewise enables execution of the operation of debugging of the non-programmed control unit, i.e., the unit UC0, with the possibility, in the case where there arise problems on one or more instructions, of deciding to implement the said instructions using the programmable unit UC1.

The same solution also determines an increase in the accessibility of the internal nodes for debugging purposes, likewise enabling generation, for a given instruction, of control signals different from the ones generated by the non-programmable control unit.

Furthermore, the solution also leads to a reduction in the costs of implementation of complex instructions.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

Of course, without prejudice to the principle of the invention, the details of implementation and the embodiments may be amply varied with respect to what is described and illustrated herein, purely by way of non-limiting example, without thereby departing from the scope of the present invention, as defined in the claims that follow.

The invention claimed is:

1. A reconfigurable control structure for CPUs, comprising:
a first control unit with a first instruction set of basic instructions associated therewith, wherein the first control unit is configured as a finite state machine that is able to assume an inoperative state and at least one active state for execution of a respective instruction comprised in the first instruction set;
a second control unit, with a second instruction set of selectively modifiable instructions associated therewith, wherein the second control unit is configured as a finite state machine that is able to assume an inoperative state and at least one active state for execution of a respective instruction comprised in the second instruction set;
a programming element associated with said second control unit for rendering said second instruction set selectively modifiable;
at least one circuit element for supplying instruction codes to be executed to said first control unit and to said second control unit, so that each instruction can be executed under the control of at least one between said first control unit and said second control unit according to whether each instruction is comprised within at least one between said first instruction set and said second instruction set, wherein the at least one circuit element is configured for sending the instruction codes to be executed in an undifferentiated way to the first control unit and the second control unit;
a selector module configured for recognizing whether the instruction to be executed each time supplied by the at least one circuit element belongs to the first instruction set or to the second instruction set, wherein the control units have respective state outputs for outputting state information and respective state inputs for receiving state information;
a single state register having an output connected to the state inputs of the control units; and
a multiplexer having first and second inputs coupled respectively to the state outputs of the control units, the multiplexer driven by the selector module and configured for sending the state register a state signal identifying which of the first and second control units generates the control signals for the instructions to be executed.

2. The structure according to claim 1, further comprising an output module which has:
a first set of input lines connected to an output of said first control unit;
a second set of input lines connected to an output of said second control unit; and
a set of output lines;
wherein said output module is connected to said selector module for transferring on said set of output lines the signal present on said first set of input lines and on said second set of input lines when said selector module recognizes whether the instruction processed each time by the structure belongs to said first basic instruction set or to said second instruction set.

3. The structure according to claim 1 wherein said first control unit is configured as a wired-logic control unit.

4. The structure according to claim 1 wherein said second control unit is basically configured as a microprogrammed-logic control unit.

5. The structure according to claim 1, wherein said second control unit is configured as a finite state machine with a memory associated therewith which is able to receive a stored microprogram defining the sequences of the control signals of said finite state machine.

6. The structure according to claim 1 wherein said first control unit and said second control unit are configured as finite state machines having respective numbers of state bits and the number of state bits of said second control unit is greater than or equal to the number of state bits of said first control unit.

7. The structure according to claim 1, wherein:
said first control unit is of a hardwired type; and
said second control unit is programmable, programming of said second control unit being carried out by said first control unit by means of instructions.

8. The structure according to claim 7, wherein programming of said second control unit by said first control unit is carried out by means of an operation of memory programming.

9. The structure according to claim 7 wherein programming of said second control unit by said first control unit is carried out by means of at least one programming instruction included in said first basic instruction set.

10. A reconfigurable control structure for CPUs, comprising:
an input for receiving instructions;
an output for presenting control signals produced by execution of the instructions;
a hard-wired control unit coupled between the input and the output and structured to execute a pre-defined set of the instructions into a plurality of the control signals, wherein the hard-wired control unit includes a finite state machine that is able to assume an inoperative state and at least one active state for execution of the instructions of the pre-defined set;
a programmable control unit coupled between the input and the output and structured to execute a programmable set of the instructions, the programmable control unit including a memory that stores definitions of the programmable set of instructions and an execution unit that executes the instructions according to the stored definitions to produce a plurality of the control signals, wherein the programmable control unit includes a finite state machine that is able to assume an inoperative state and at least one active state for execution of the instructions of the programmable set;
a selector module coupled to the input and configured to recognize whether each of the instructions received at the input is to be executed by the hard-wired control unit or by the programmable control unit, wherein the control units have respective state outputs for outputting state information and respective state inputs for receiving state information;
a switching device having first and second inputs coupled respectively to the state outputs of the control units, an output, and a control input coupled to an output of the selector module, the switching device being structured to selectively connect the output of the switching device to one of the first and second inputs depending on which of the control units the selector module recognizes as being appropriate for executing a current one of the instructions received by the selector module; and
a state register having an input connected to the output of the switching device and an output connected to the state inputs of the control units.

11. The control structure of claim 10, further comprising:
an output module having a first input connected to an output of the hard-wired control unit, a second input connected to an output of the programmable control unit, an output coupled to the output of the control structure, and a control input coupled to an output of selector module, the output module being structured to selectively connect the output of the output module to one of the first and second inputs depending which of the control units the selector module recognizes as being appropriate for executing a current one of the instructions received by the selector module.

12. The control structure of claim 10 wherein programming of the programmable control unit by the hard-wired control unit is carried out by means of at least one programming instruction included in the pre-defined set of instructions.

13. A reconfigurable control structure for CPUs, comprising:
a hard-wired control unit with a first instruction set of basic instructions associated therewith, wherein the hard-wired control unit is configured as a finite state machine that is able to assume an inoperative state and at least one active state for execution of a respective instruction comprised in the first instruction set;
a programmable control unit configured as a finite state machine that is able to assume an inoperative state and at least one active state for execution of a respective instruction comprised in a second instruction set of selectively modifiable instructions associated therewith, wherein the programmable control unit is programmed by the hard-wired control unit by means of at least one basic instruction within the first instruction set;
at least one circuit element for supplying instruction codes to be executed to said hard-wired control unit and to said programmable control unit, so that each instruction can be executed under the control of at least one between said hard-wired control unit and said programmable control unit according to whether each instruction is comprised within at least one between said first instruction set and said second instruction set, wherein the at least one circuit element is configured for sending the instruction codes to be executed in an undifferentiated way to the hard-wired control unit and the programmable control unit;
a selector module configured for recognizing whether the instruction to be executed each time supplied by the at least one circuit element belongs to the first instruction set or to the second instruction set, wherein the control units have respective state outputs for outputting state information and respective state inputs for receiving state information;
a single state register having an output connected to the state inputs of the control units; and
a multiplexer having first and second inputs coupled respectively to the state outputs of the control units, the multiplexer driven by the selector module and configured for sending the state register a state signal identifying which of the hard-wired and progammable control units generates the control signals for the instructions to be executed.

14. The structure according to claim 13, wherein programming of said programmable control unit by said hard-wired control unit is carried out by means of an operation of memory programming.

15. The structure according to claim 13, further comprising an output module comprising:
a first set of input lines connected to an output of said hard-wired control unit;
a second set of input lines connected to an output of said programmable control unit; and
a set of output lines;

wherein said output module is connected to said selector module for transferring on said set of output lines the signal present on said first set of input lines and on said second set of input lines when said selector module recognizes whether the instruction processed each time by the structure belongs to said first instruction set or to said second instruction set.

16. The structure according to claim 13 wherein said programmable control unit is basically configured as a microprogrammed-logic control unit.

17. The structure according to claim 16, wherein said programmable control unit is configured as a finite state machine with a memory associated therewith which is able to receive a stored microprogram defining the sequences of the control signals of said finite state machine.

18. The structure according to claim 13 wherein said hard-wired control unit and said programmable control unit are configured as finite state machines having respective numbers of state bits and the number of state bits of said programmable control unit is greater than or equal to the number of state bits of said hard-wired control unit.

* * * * *